United States Patent
Bentaleb et al.

(10) Patent No.: US 11,621,985 B2
(45) Date of Patent: Apr. 4, 2023

(54) CHUNK-BASED PREDICTION ADAPTATION LOGIC

(71) Applicant: BITMOVIN, INC., San Francisco, CA (US)

(72) Inventors: Abdelhak Bentaleb, Singapore (SG); Martin Fillafer, Klagenfurt am Wörthersee (AT); Daniel Weinberger, Klagenfurt am Wörthersee (AT)

(73) Assignee: BITMOVIN, INC., San Francisco, CA (US)

( * ) Notice: Subject to any disclaimer, the term of this patent is extended or adjusted under 35 U.S.C. 154(b) by 0 days.

(21) Appl. No.: 17/336,009

(22) Filed: Jun. 1, 2021

(65) Prior Publication Data

US 2021/0289013 A1 Sep. 16, 2021

Related U.S. Application Data

(63) Continuation of application No. PCT/US2020/017691, filed on Feb. 11, 2020.

(60) Provisional application No. 62/803,716, filed on Feb. 11, 2019.

(51) Int. Cl.
*H04L 65/61* (2022.01)
*H04L 67/02* (2022.01)

(52) U.S. Cl.
CPC .............. *H04L 65/61* (2022.05); *H04L 67/02* (2013.01)

(58) Field of Classification Search
CPC .............................. H04L 65/61; H04L 67/02
See application file for complete search history.

(56) References Cited

U.S. PATENT DOCUMENTS

| 5,884,037 A * | 3/1999 | Aras | H04L 47/781 709/226 |
| 6,760,716 B1 * | 7/2004 | Ganesamoorthi | G05B 13/027 706/14 |
| 8,429,516 B1 * | 4/2013 | Riggs | G06F 21/6254 715/201 |
| 2002/0136298 A1 | 9/2002 | Anantharamu et al. | |
| 2008/0191816 A1 | 8/2008 | Balachandran et al. | |
| 2009/0300203 A1 | 12/2009 | Virdi et al. | |
| 2010/0189183 A1 | 7/2010 | Gu et al. | |

(Continued)

OTHER PUBLICATIONS

Xiaoqi Yin et al., "A Control-Theoretic Approach for Dynamic Adaptive Video Streaming over HTTP," 2015. (Year: 2015).*
Junchen Jiang et al., "Improving Fairness, Efficiency, and Stability in HTTP-based Adaptive Video Streaming with FESTIVE," 2012. (Year: 2012).*

(Continued)

*Primary Examiner* — Andrew C Georgandellis
(74) *Attorney, Agent, or Firm* — Marton Ribera Schumann & Chang LLP; Chien-Ju Alice Chuang; Hector J. Ribera (57) ABSTRACT

A multimedia player downloads chunks (parts of the segment file) during the download of a segment of a stream of segments of a low-latency stream. The first chunks of a segment may be downloaded while the segment is still being written to the CDN server. A chunk-based prediction adaptation logic uses throughput measurements on a chunk instead of a segment and specifically looks at bursts in a sliding window. This data is used to build a prediction of future throughput by applying linear adaptive filter algorithms that may rely on recursive least squares. This adaptation logic leads to very accurate bandwidth predictions and as a consequence, better user experience, compared to existing adaptation algorithms.

19 Claims, 3 Drawing Sheets

(56) References Cited

U.S. PATENT DOCUMENTS

2017/0026713 A1     1/2017    Yin et al.
2022/0036216 A1*   2/2022    Yagnik .................. G06N 20/00

OTHER PUBLICATIONS

European Application No. 20756353.7, Extended European Search Report dated Nov. 3, 2021, 7 pages.

Kurdoglu et al. "Real-Time Bandwidth Prediction and Rate Adaptation for Video Calls Over Cellular Networks," Proceedings of the 7th International Conference on Multimedia Systems, Jan. 1, 2016, 7 pp. 1-11.

Robitza et al., "A modular HTTP Adaptive Streaming QoE Model—Candidate for ITU-T P.1203 ("P-NATS")," 2017 Ninth International Conference on Quality of Multimedia Experience (QOMEX), May 31, 2017. pp. 1-6.

Zhang et al., "Deep Learning in Mobile and Wireless Networking: A Survey," arxiv.org, Cornell University Library, Mar. 12, 2018, pp. 1-67.

Kryftis et al., "Resource Usage Prediction Algorithms for Optimal Selection of Multimedia Content Delivery Methods," 2015 IEE International Conference on Communications (ICC), Jun. 8, 2015, pp. 5903-5909.

Abdelsalam et al., "Evaluation of DASH Algorithms on Dynamic Satellite-Enhanced Hybrid Networks," 2018 International Symposium on Advanced Electrical and Communication Technologies (ISAECT), Nov. 21, 2018, pp. 1-6.

125. MPEG Meeting, "WD of ISO/IEC 23000-19 2nd edition CMA," Motion Picture Expert Group or ISO/IEC, Jan. 22, 2019, pp. 1-150.

International Application No. PCT/US20/17691, International Search Report and Written Opinion dated May 13, 2020, 7 pages.

Bentaleb et al. "Bandwidth Prediction in Low-Latency Chunked Streaming," NOSSDAV, Jun. 19, 2019, 7 pages.

* cited by examiner

CHUNK-BASED PREDICTION ADAPTATION LOGIC

CROSS-REFERENCE TO RELATED APPLICATIONS

This application is a continuation of International Application No. PCT/US2020/017691 titled "Chunk-based Prediction Adaptation Logic," filed Feb. 11, 2020, which claims priority to U.S. Provisional Patent Application No. 62/803,716 entitled "Chunk-based Prediction Adaptation Logic," filed Feb. 11, 2019, all of which are incorporated herein by reference in its entirety.

BACKGROUND

The present application is related to an adaptation logic in a media player for varying a bitrate at which low latency segments of a sequence of segments of time-varying content are to be retrieved for playback.

The transport of information content such as multimedia content over the Internet has gained momentum and entered our daily lives, whether it be a major live event or on-demand access. For example, we see people accessing live sport events or watching their favorite TV series on a plethora of devices ranging from high-resolution, well-connected TV sets to smart phones with limited display and network capabilities. All of these use cases have something in common, namely the content is delivered over the Internet and on top of the existing infrastructure. In general, the amount of video traffic is growing tremendously, specifically for mobile environments (e.g., Wi-Fi, 3/4/5G, smart phones, tablets), and the existing Hypertext Transfer Protocol (HTTP) infrastructure has become an important driver for this type of application despite it being mainly deployed over the Transmission Control Protocol (TCP).

The advantage of using HTTP is that it is client-driven and scales very well, thanks to its stateless design. Furthermore, the delivery of multimedia content over HTTP exploits existing infrastructure initially deployed for World Wide Web traffic, such as Web servers, proxies, caches, and content distribution networks (CDNs). Additionally, the use of HTTP over TCP/IP typically does not cause any firewall or network address translation (NAT) issues, which was a main reason for the Realtime Transport Protocol (RTP) not being widely adopted for multimedia transfers. Finally, the use of HTTP allows for a receiver/client-driven approach—in contrast to a sender/server-driven approach—without the need for an explicit adaptation loop (feedback channel). Such a client-driven approach further increases scalability and enables flexibility as usually the client or receiver knows its context best.

HTTP adaptive streaming (HAS) is now widely used for delivering live video services on the Internet, because of its scalability and low cost. The basic concept of existing HAS solutions, such as DASH or HLS, is to provide multiple versions of the same content (e.g., different bitrates), chop these versions into small segments (e.g., two seconds), and let the client decide which segment (of which version) to download next, based on its context (e.g., bandwidth). Typically, the relationship between the different versions is described by a manifest, which is provided to the client prior to the streaming session.

In the last few years, interoperability between players has been widely advanced since the adoption of ISO/IEC MPEG Dynamic Adaptive Streaming over HTTP (DASH), a standardized solution based on 3GPP's Adaptive HTTP Streaming (AHS). However, significant fragmentation remains with several streaming formats being used, including HTTP Live Streaming (HLS), Smooth, HDS and MPEG DASH. More recently, Smooth and HDS are being phased out and replaced with DASH, but two major competing approaches remained, DASH and HLS.

DASH specifies representation formats for both the manifest and segments. DASH supports the MPEG-2 transport stream (M2TS) segment format and the ISO base media file format (ISOBMFF), which is the format most widely in use. For the manifest, DASH defines the XML-based Media Presentation Description (MPD) representing the data model, which is aligned with existing, proprietary solutions, i.e. provide multiple versions of the same content—referred to as representations—chop the content into time-aligned segments to enable seamless switching between different representations, and enable the client to request these segments individually based on its current conditions. The standard provides a specification only for the 1MPD and segment formats, respectively.

Apple, Inc. developed HLS format, which is used by the very popular Apple iOS, tvOS, and macOS devices. HLS is similar in operation to DASH but it specifies incompatible representation formats for manifest and segments. HLS specifies a single segment format based on MPEG-2 transport streams (M2TS). For the manifest, HLS defines a m3u8 file format that is incompatible with MPD used by DASH. Due to the incompatible aspects of these approaches, content producers continue to generate duplicative content formatted for distribution using both of these streaming formats.

In order to reduce this content production divergence, Apple announced the introduction of support in HLS for a new media file format, Common Media Application Format (CMAF), which uses containers based on a variant of the ISOBMFF segment format used by DASH. CMAF defines the encoding and packaging of segmented media objects for delivery and decoding on end user devices in adaptive multimedia presentations. In particular, this is (i) storage, (ii) identification, and (iii) delivery of encoded media objects with various constraints on encoding and packaging. That means, CMAF defines not only the segment format but also codecs and most importantly media profiles (i.e., for AVC, HEVC, AAC). However, CMAF does not define a manifest format, being compatible with both DASH's MPD and HLS's m3u8 manifest files.

CMAF's data model introduces changes over the exiting HLS and DASH approaches. For example, an MPD may contain multiple periods, each period may contain multiple adaptation sets and each adaptation set may contain multiple representations which provide references (in form of HTTP-URLs) to the actual segments. Any manifest can be used to instantiate the CMAF media object model. Periods in DASH are presentations in CMAF but there is no concept above presentations defined in CMAF. Each CMAF presentation may contain multiple CMAF selection sets for component selection (e.g., codecs, audio/subtitle languages). Each CMAF selection set may contain multiple switchable CMAF tracks, becoming a switching set. The functionality of selection set and switching set of CMAF is implemented as adaptation set within DASH (where the @group attribute has a specific and also legacy meaning). A CMAF track basically corresponds to a DASH representation switchable (i.e., allowing for dynamic adaptive streaming) within a CMAF switching set or DASH adaptation set respectively.

DASH initialization segments are referred to as headers in CMAF and CMAF fragments basically correspond to DASH segments. CMAF also defines segments and chunks as well as the term CMAF resource and CMAF track (files). A CMAF segment many contain multiple CMAF fragments but no CMAF header and a CMAF fragment is actually an ISOBMFF segment with additional constraints. A CMAF chunk is basically a sequential and contiguous subset (i.e., a set of samples) of a CMAF fragment enabling low-latency streaming. The CMAF low-latency streaming mode is enabled by the use of chunks, where each chunk can be 500 milliseconds or lower depending on encoder configurations. With low-latency CMAF or chunked CMAF, the player can now request incomplete segments and get all available chunks to render instead of waiting for the full segment, which could be 2 or more seconds, to become available, thereby cutting latency down significantly.

A CMAF sample, as defined in ISOBMFF, is "all the data associated with a single timestamp." A CMAF resource can be identified using an identifier (URI, URL) and a CMAF track file is an ISOBMFF file containing both CMAF header and fragments. CMAF tracks are independent, i.e., contain only CMAF Fragments of the same media stream—no multiplexed content—and strictly aligned (synchronized) with each other to facilitate bitstream switching, i.e., the core functionality of dynamic adaptive streaming. However, this also requires that all CMAF fragments need to start with independently decodable media data within a switching set and a few other constraints (e.g., same height, width and position; same aspect ratio, framing (position and cropping within coded blocks), transfer function, bit depth, color subsampling, color volume, and presentation timing).

Providing low-latency streaming using existing HAS-based solutions was a very challenging task. The new CMAF-based HTTP chunked transfer encoding concept allows a video segment to be generated and delivered concurrently. With existing HAS solutions, the most challenging part of a multimedia client implementation is the component that determines which segment to download next. This component is often referred to as adaptation logic. After receipt of the manifest (MPD or m3u8), it basically analyzes the available representations (e.g., bitrates, resolutions) given the current context (e.g., bandwidth, display size) and starts downloading the segments accordingly. In case the context changes (e.g., due to a drop of the available bandwidth), the client may switch to another representation that is suitable for the new context. Traditionally, the actual switching is typically done at segment boundaries and, in general, the behavior of the adaptation logic has a direct influence on the system performance.

These existing adaptation logic algorithms do not perform well with CMAF low-latency live streams. Using HTTP chunked transfer encoding with existing adaptive bitrate (ABR) schemes leads to inaccurate throughput estimation which may lead to wrong bitrate selection and then a low quality of experience (QoE). This inaccuracy happens because the existing ABR schemes perform the throughput estimation on segment boundaries or they use the last segment download throughput measurement to select the bitrate. With the low-latency streams, each data segment consists of multiple much shorter chunks. A whole segment is requested by the client, but as soon as one of the chunks is completely downloaded, the playback can be started. In this HTTP chunked transfer encoding, the set of segments are subdivided into multiple chunks, where usually the segment duration is between 6 to 8 seconds, and chunk duration is between 100 milliseconds to 1 second. The client requests the encoded chunks from the server before the entire corresponding segment is ready and the chunks can begin being downloaded.

Due to the low-latency requirements of CMAF-based streaming, a video player's playback buffer must be kept to a minimum. This, in turn, makes the buffer size an unusable metric of the state or conditions to control downloads for traditional adaptation logic approaches, leaving throughput measurements as the main bitrate selection tool. But segment-based throughput measurements do not perform well and are not reliable for use in low-latency streaming scenarios. This leads to inaccurate and unusable measurements and bandwidth predictions due to the bursty nature of CMAF low-latency live streams, which consist of much shorter chunks. This is due to the fact that segments are written to the storage/CDN, advertised in the manifest and downloaded by a player while the rest of the media segment is still being encoded and written to the media file. This can result in the problem that it may take longer to encode a part of the video and the HTTP(S) connection is held idle until enough data is available for the transmission, impacting the throughput measurement. However, chunks may be available for download faster given that the chunks are usually kept very small to improve the latency.

Existing ABR schemes show inefficiency and inaccuracy limitations when they have integrated with CMAF chunked delivery, in particular, an inaccurate throughput estimation which leads to sub-optimal ABR decisions, and thus, the player will experience unsatisfactory QoE. This throughput estimation inaccuracy appears because of the existing ABR schemes employ the standard estimation for every segment download, and the segments in HTTP chunked transfer encoding with CMAF are delivered with consistent timing (i.e., the segment download times are almost equal, and these times are approximated to the segment duration). Hence, when the HAS players use the segment download time to estimate the throughput, they got the same throughput value every segment download, and this value is exactly equal to the encoded bitrate of the segment, and this will prevent the ABR scheme from switching between different bitrate levels.

Thus, what is needed is an improved adaptation logic approach that accounts for the smaller chunk-based low latency streaming of multimedia content.

SUMMARY

To address the issues with existing approaches, a novel ABR scheme for HTTP chunked transfer encoding is disclosed. The new approach leverages the burst nature that is introduced during every chunk download and uses a sliding window moving average throughput estimation algorithm to estimate the throughput at chunk boundary. Using the throughout estimation history, the new approach uses an online linear adaptive filter to estimate the future bandwidth and determines the best bitrate to take in the next step. Thus, the disclosed approach significantly minimizes stalls, throughput estimation inaccuracy, and maintain target latency in case of network condition fluctuations. Experimental results have shown that embodiments according to the disclosed approach can reduce significantly the stalls by 64%, improve the video quality by 27%, and maintain the latency within a target range of 2.5-3.2 seconds.

The figures depict various example embodiments of the present disclosure for purposes of illustration only. One of ordinary skill in the art will readily recognize from the following discussion that other example embodiments based on alternative structures and methods may be implemented without departing from the principles of this disclosure and which are encompassed within the scope of this disclosure.

DESCRIPTION OF EMBODIMENTS OF THE INVENTION

The following description describes certain embodiments by way of illustration only. One of ordinary skill in the art will readily recognize from the following description that alternative embodiments of the structures and methods illustrated herein may be employed without departing from the principles described herein. Reference will now be made in detail to several embodiments.

The above and other needs are met by the disclosed methods, a non-transitory computer-readable storage medium storing executable code, and systems for encoding video content.

Figure 1:
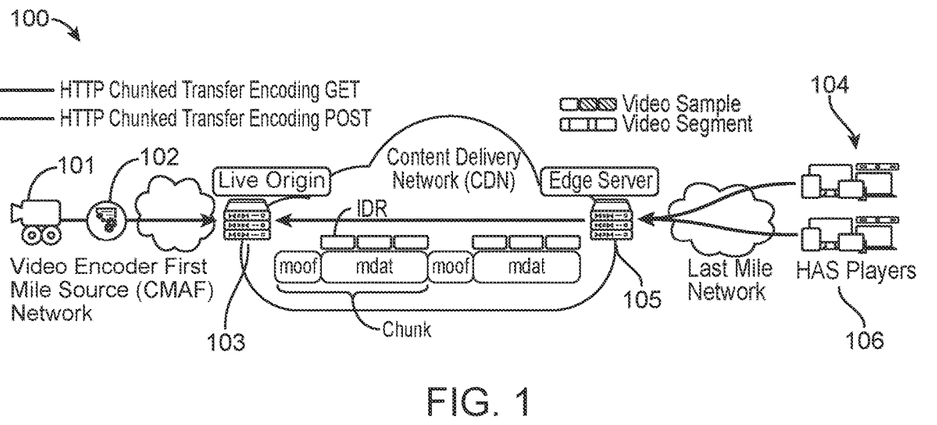
FIG. 1 is an illustrative diagram of a multimedia streaming system architecture according to embodiments.

Referring to FIG. 1, a general overview of the HAS delivery system 100 with CMAF low-latency enabled for live streaming according to one embodiment. A video source 101 generates video, and then an encoder 102 (for example with CMAF packaging) pushes the encoded chunks to a live origin 103, for example via an HTTP POST through a wired or wireless Internet network. According to embodiments, a live origin 103 consists of two layers, an ingest layer to accept the video content and a mid-tier layer to present the video for delivery. In the player side, in embodiments, a multimedia player 104 pulls encoded chunks from an edge server 105, for example a HAS player 104 may use HTTP GET commands to retrieve chunks for the edge server 105. The edge server 105 gets the encoded chunks from the live origin 103. In this exemplary embodiment, the delivery of CMAF chunks is performed via HTTP chunked transfer encoding concept (referred to CMAF low-latency). In embodiments, the chunk delivery process may be performed via fetch request instead of XMLHttpRequest (XHR).

The multimedia player 104 may be part of any type of device 106. For example, device 106 may be a mobile phone, smartphone, tablet, laptop, or other computer, VR device, smartTV, OTT box, or any other device capable of playing back multimedia, for example with a multimedia player software implementing a multimedia player 104. Multimedia includes video and/or audio in any form, including streaming or downloaded video, music, computer games, simulations, 3D content, virtual reality or augmented reality presentations and the like. In this embodiment, a playback device 106 includes one or more multimedia HAS players 104. Multimedia player 104 may be an HTML5 adaptive video player provided by Bitmovin, Inc. of San Francisco, Calif., compatible with a number of Web browsers, operating systems, and platforms, including Android, iOS, tvOS, Roku, smartTvs, Mac OS, Windows, Linux, and others. In one embodiment, the player device 106 includes one or more data connections, including for example, wired or wireless connections, such as via Bluetooth, Wi-Fi, cellular (e.g., 2G/3G/4G/LTE/5G), USB, Ethernet, HDMI, or similar data connections.

Figure 2:
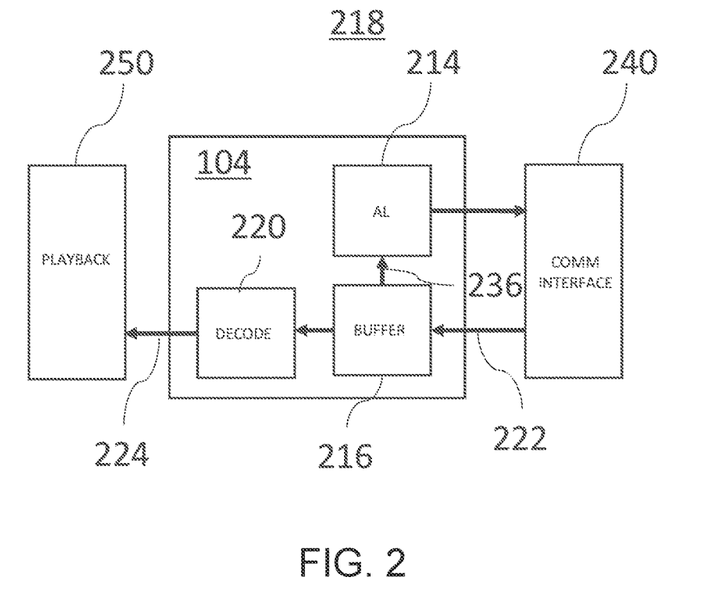
FIG. 2 shows a block diagram of a client device in accordance with an embodiment, the client device comprising the adaptation logic of FIG. 3.

Now referring to FIG. 2, a block diagram of multimedia player 104 is shown according to one embodiment. In one embodiment, an adaptation logic 214 is responsible for controlling a bitrate at which a media content is retrieved through communications interface 240 from a server so as to be buffered in a buffer 216 of a client 218 to be reproduced via a client's decoder 220 and playback interface 250. The client 218 may comprise the buffer 216 and decoder 220 connected in series between an input 222 from a communications interface 240 at which the received media data stream representing the media content is received, and an output 224 to a playback interface 250 to which decoder 220 outputs the reconstructed version of the media content, wherein the client 218 also comprises the adaptation logic 214 which controls the bitrate at which the chunks in segments of a sequence of segments, into which the media content is subdivided, are retrieved from the server (e.g., edge server 105) using, for example, HLS or DASH adaptive streaming protocols. The player 104 components, including the adaptation logic shown in FIG. 2, may be implemented in software, programmable hardware or hardware. The client device shown in FIG. 2 may likewise be implemented in software, programmable hardware or hardware itself. In particular, the client may be an application running, for example, on a mobile device such as a mobile communication device having for example an LTE, Wi-Fi, or other wireless data interface, such as device 106 in FIG. 1.

Figure 3:
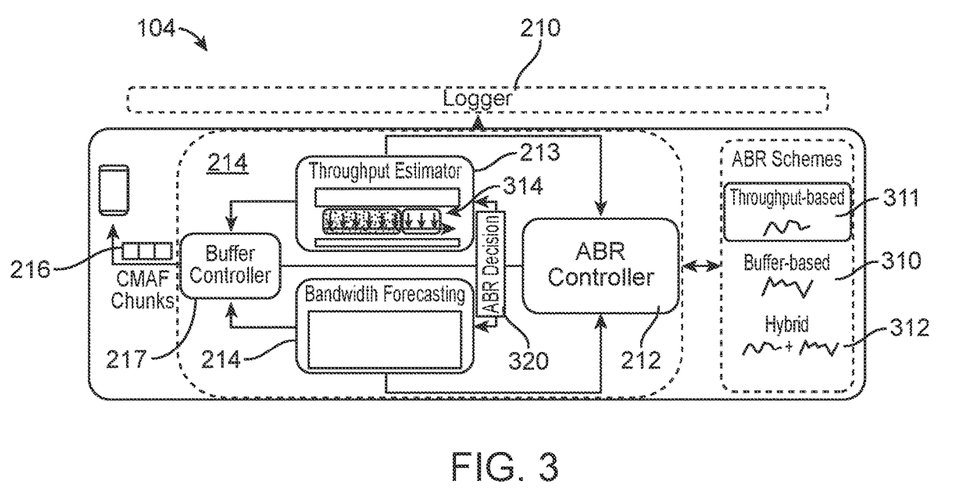
FIG. 3 shows a block diagram illustrative of an adaptation logic in a multimedia player in accordance with an embodiment.

Now referring to FIG. 3, a block diagram illustrating components of a streaming multimedia player according to one embodiment is provided. In embodiments, the adaptation logic 214 comprises an ABR controller 212, a throughput estimator 213, and a bandwidth forecasting module 214. The player may also include a logger 210 that periodically records the player status like the selected bitrate, buffer occupancy, average throughput, throughput forecasting, stalls, bitrate switch and its duration, startup delay, and the like.

The adaptation logic 214 sets the bitrate $r_i$ or ABR decision 320 at which the current stream data element i is to be retrieved using one or more approaches based on a buffer fill status 310 of a buffer buffering the stream data, a measure of a retrieval throughput 311 at which the stream data is retrieved, or using a hybrid approach 312 with a combination of the two. In embodiments, the adaptation logic 214 may include additional components, such as for example an oscillation compensator (not shown) as fully described in U.S. Pat. No. 9,544,352, titled Adaptation Logic for Varying a Bitrate, incorporated herein by reference in its entirety.

In one embodiment, the ABR Controller 212 may use information such as the retrieval throughput measure(s) 311, and/or the buffer fill status 310/312 concerning buffer 216 so as to preliminarily set the bitrate 320 or alternatively speaking, find a preliminary value for a bitrate $r_i$, which may be modified before becoming the final bitrate value, for example to avoid playback quality oscillations. Ultimately, ABR Controller 212 will provide a bitrate $r_i$ 320 as the output of the adaptation logic to control the streaming of the multimedia content.

For example, in one embodiment, the streaming of a CMAF-based low latency stream is adapted based on throughput measurements for the download of chunks within segments of the segmented stream. In such an embodiment, the use of buffer 216 is optimally minimized for "live" streaming of low-latency multimedia content. Accordingly, buffer fill 310 is not used by ABR Controller 212 for the adaptation logic. Instead, ABR Controller 212 uses throughput measure 310 ($c_i$) based on the throughput of the chunk data of the CMAF stream received from the server. This chunk-based prediction adaptation logic uses throughput measurements on a chunk instead of a segment and specifically looks at bursts in a sliding window z in the order of microseconds.

According to embodiments, the ABR decision 320, is selected for each chunk to be downloaded. As noted above, ABR Controller 212 implements three main heuristic-based ABR schemes which are, (1) Throughput-based 311: using the estimated throughput to perform the ABR decisions, (2) Buffer-based (BOLA) 310: using the playback buffer occupancy to perform the ABR decisions, and (3) Hybrid 312: using a mix of throughput-based and buffer-based information. In embodiments, ABR Controller 212 can also monitor the playback buffer occupancy through the Buffer Controller 217 component to avoid stall and maintain the buffer occupancy within a safe region, between minimum and maximum predefined thresholds for CMAF low latency.

For CMAF-based low latency streaming according to embodiments of the disclosure, ABR Controller 212 relies on the throughput-based ABR scheme which is in turn based on throughput estimator 213 and bandwidth forecasting component 214 further described below. In embodiments, for every chunk downloading step i, the ABR Controller 212 takes the bandwidth forecasting value $\hat{c}_{i+1}$ as an input and outputs the optimal bitrate level. In one embodiment, the objective function $\mathcal{F}$ may be defined as:

$$\mathcal{F}: \begin{bmatrix} \text{find } r_i^\star \\ \text{argmin } \epsilon_i \text{and argmax } QoE_i \forall \ i > 0, \\ \text{s.t. } l_i \leq l_{target} \\ c_i \approx y_i, \text{ and } r_i \stackrel{\star}{\sim} \hat{c}_{i+1} \\ 0.5 \leq B_i \leq l_{target} \end{bmatrix}$$

where the objective is to find the optimal bitrate level r★∈ bitrate level list R that minimizes the estimated error and maximizes the QoE respecting the target latency $l_{target}$ while keeping the current latency $l_i$ sufficiently small, with the current network capacity and current playback buffer occupancy Bi.

For example, in one embodiment, throughput estimator 213 implements a sliding window 314 moving average throughput estimation. This estimation computes the average throughput $c_i$ for the past recent sliding window size z successful chunk downloads, where z is the window size determined by the player. In one embodiment, z is a programmable parameter that can be set to any integer number, for example a number between 2 and 6, preferably 3. At each chunk downloading step i, the average throughput $c_i$ is calculated as follows $$c_i = \frac{1}{Z} \sum_{n=0}^{z-1} Sample_{i-n} \quad \text{(Eq. 1)}$$

where each Sample is the last throughput of the downloaded chunk, and it is computed as: chunk size/chunk download time. Thus, according to this embodiment, leveraging the fact that the chunks downloads are bursty, the throughput estimation algorithm gives more accurate throughput values at a finer chunk-based level.

Referring back to FIG. 3, in embodiments, the bandwidth forecasting module 214 implements a bandwidth forecast approach, such as for example, a linear history-based bandwidth forecast. In one embodiment, bandwidth forecasting module 214 comprises an online linear adaptive filter based on Recursive Least Squares (RLS) approach, as for example described in Simon S Haykin. 2008. *Adaptive filter theory*. Pearson Education India. However, other bandwidth forecasting approaches using deep reinforcement learning and/or autoregressive integrated moving average (ARIMA) may be employed in some embodiments.

Figure 4:
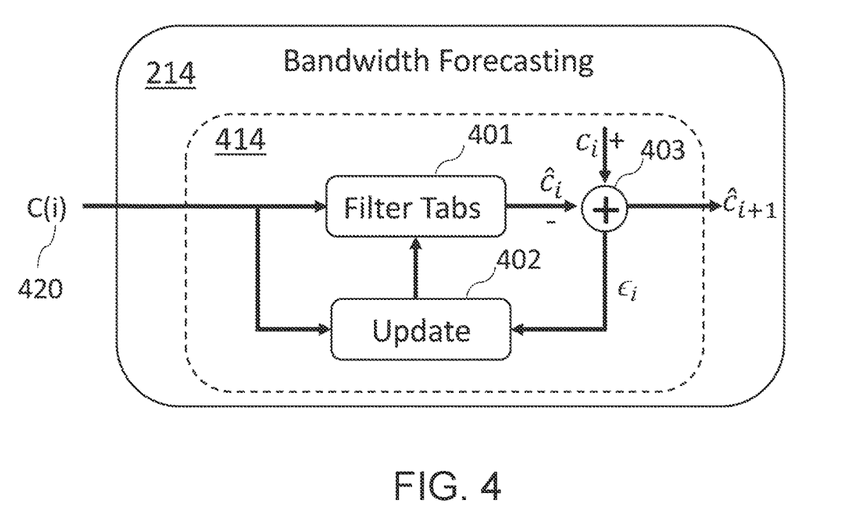
FIG. 4 shows a block diagram illustrating a bandwidth forecasting module in accordance with an embodiment.

Referring now to FIG. 4, a block diagram illustrating a bandwidth forecasting module 214 according to one embodiment is provided. In this embodiment, bandwidth forecasting module 214 includes an adaptive filter 414. The adaptive filter 414 includes a filter tabs module 401, an update module 402, and a summation module 403.

Figure 5:
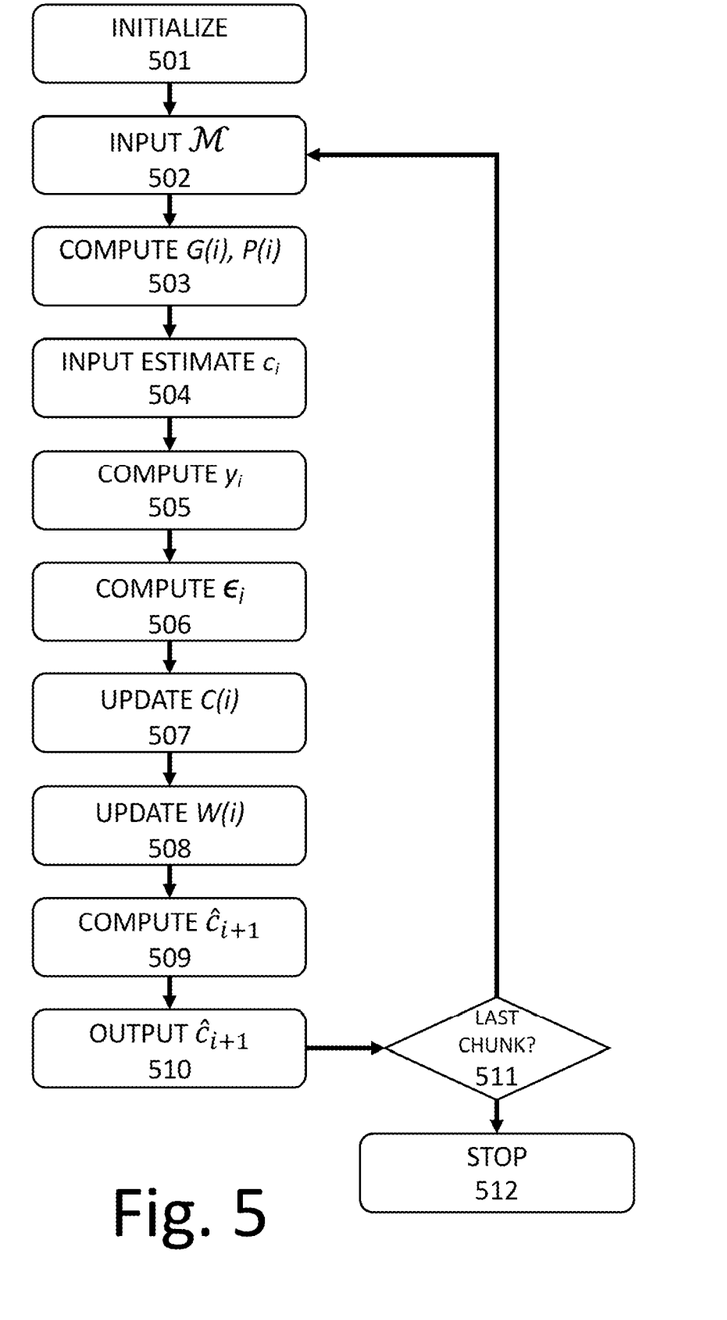
FIG. 5 shows a method for adaptive filtering.

As illustrated in FIG. 5, an RLS adaptive filtering method is provided according to embodiments of the disclosure. In embodiments, as an initial step 501, a filter tabs vector W, a vector of filter coefficients having length $\mathcal{M}$, is initialized as W(0)=0, an error estimate error ϵ is also set to 0, and a throughput estimation vector C is also initialized as C(0)=0. At this initialization step 501, initial inverse correlation matrix P(0), an inverse correlation matrix of size $\mathcal{M} \times \mathcal{M}$, is set to equal to I×σ⁻¹, where σ is an initial input variance estimate parameter that can be programmed to a preset value. For example, in one embodiment, σ is set to 0.001 but different values may be used in different embodiments, such as for example 0.001, 0.01, or 0.1 or any number substantially within the range of 0.9 to 0.0001. As part of the initialization process, a forgetting factor λ may also be programmed to a specific value to reduce the weight of throughput estimates as the system operates. In one embodiment, forgetting factor λ is set to 0.999 but different values may be used in other embodiments, such as for example 0.99, 0.5, or 0.1 or any number substantially within the range of 0.9 to 0.01. For example, machine learning techniques or other experimental approaches may be used to determine optimal values for σ and λ as well as the filter length M and window size z, that can respect the objective function F and minimize the estimated error ϵ. These parameters may be modified for each streaming session, content title, or the like. Further, given the monitoring of network conditions, these parameters may be changed to optimize the output during a streaming session.

Following initialization, during streaming operation, for each chunk downloading step i, a vector $\mathcal{M}$ of the most recent throughput estimation values C(i), for example as output by a throughput estimator 213, is input 502. Then, gain vector G(i) and inverse correlation matrix P(i) of throughput estimation values are recursively computed 503, for example based on equations 2 and 3:

$$G(i) = \frac{\lambda^{-1} P(i-1) C(i-1)}{1 + C^T(i-1) P(i-1) C(i-1)} \quad \text{(Eq. 2)}$$

$$P(i) = \lambda^{-1} P(i-1) - \lambda^{-1} G(i) C^T(i-1) P(i-1) \quad \text{(Eq. 3)}$$

The estimated average throughput for the step i, $c_i$, is input 504, for example from the output of a chunk-based throughput estimator. The bandwidth forecast $y_i$ at the chunk downloading step i is then computed 505, for example based on equation 4:

$$y_i = \hat{c}_i = W^T(i-1)C(i-1) \quad \text{(Eq. 4)}$$

At this point, estimated error $\epsilon_i$ is computed 506 as the difference between input average throughput $c_i$ and the computed bandwidth estimate $y_i$. The most recent throughput estimation values C(i) is updated 507 with the current value $c_i$. The filter tabs vector W is also updated 508 based on the estimate error as W(i)=W(i−1)+$\epsilon_i$ G(i). Finally, the future bandwidth estimation for the next step $\hat{c}_{i+1}$ is computed 509 as W(i) C(i) and output 510. The process then repeats 511 for the next chunk downloading step until the streaming stops 512.

For embodiments implementing a bandwidth prediction filter according to FIG. 5, accurate bandwidth forecasting is provided while striving to minimize the error (min $\epsilon_i$) between the next (step i+1) throughput estimation and current (step i) future bandwidth forecasting. The computational complexity and overhead of this method can be very low depending on the filter length M, where the overall complexity is $O(M^2)$ per-time iteration.

According to embodiments, an RLS-based adaptive filter is used but alternative embodiments may include different adaptive filters. The use of RLS-based filters in some embodiments beneficially provides an approach that is frequently used in practical real-time systems when there is a limitation in computational complexity as is the case for CMAF low latency streaming, with small occupancy buffer, requiring a bitrate selection that should be online and in a short time. Further, RLS-based filters do not need a prediction model for input and provide a very accurate bandwidth forecasting leveraging the fact that estimated bandwidth values are correlated, stationary, and deterministic. Moreover, the proposed adaptive filter method is robust against time-varying network conditions through the forgetting factor $\lambda$, where such factor does not rely on the time-evolution model for the system and gives exponentially less weight to the past throughput estimations.

According to an experimental embodiment, a CMAF low-latency streaming system included two computer systems (running Ubuntu 18.04 LTS). One computer ran a modified dash.js player in a Google Chrome browser (v63) according to this disclosure. In this embodiment, for both throughput estimator and bandwidth forecasting modules of the adaptation logic in the player, the following parameter values were tested: z=[2 to 5], M=[2 to 5], σ=[0.001, 0.01, 0.1], and λ=[0.99, 0.5, 0.1]. Another computer acted as a proxy to simplify bandwidth shaping between the client and the server. The HAS servers (origin and edge) were Cloudflare8 servers with CMAF packaging encoder and delivery enabled.

Table 1 provides the set of bandwidth profiles used for testing the experimental embodiment:

TABLE 1

| Network Profile | Throughput Values (Mbps) | Inter-variation Duration (s) |
|---|---|---|
| BW1 | 4, 3.5, 3, 2.5, 3, 3.5 | 30 |
| BW2 | 5, 3, 2.5, 2, 2.5, 3, 5, 3 | 30 |
| BW3 | 5, 1.8 | 180 |
| BW4 | 5, 2.5, 1.5, 1, 1.5, 2.5, 5, 2.5 | 30 |

As Table 1 shows, in this experimental embodiment four network conditions profiles were used for evaluation, denoted BW1 to BW4. These profiles were taken from the DASH IF guidelines of real-world bandwidth measurement dataset. Profiles BW1, BW2, and BW4 follow the cascade pattern (high-low-high and low-high-low), while profile BW3 follows the sudden bandwidth drop-up pattern. Each profile consists of different bandwidth values, RTTs (in milliseconds), packet loss rates (in percentage), and bandwidth variation durations (in seconds). In the experimental embodiment, both computers were connected through a Cisco router and tc-NetEm was used to shape the network capacity according to the set of bandwidth variation profiles, including RTTs and packet loss rates sequentially, as: (38 ms, 0.09%), (50 ms, 0.08%), (75 ms, 0.06%), (88 ms, 0.09%), (100 ms, 0.12%). In this embodiment, the minimum and maximum buffer thresholds were set as 0.5 second and target latency, respectively. In this embodiment, iPerf9 was used to generate random TCP-based cross traffic that ranged between 0.5 and 2 Mbps.

The experimental embodiment was tested with a movie video, where the HAS server with CMAF packaging capabilities served this video. Each segment is 6 seconds in duration and encoded into three bitrate levels for media {700, 1300, and 2000} Kbps and one bitrate level for audio 96 Kbps. The chunk duration is 500 milliseconds, the target latency is set to 3.2 seconds, and each live streaming session is 560 seconds long.

In the experiments run, the embodiment according to this disclosure as compared to existing ABR schemes, selected the best bitrates resulting in a total average of 1.6 Mbps ranging between 1.4 and 1.7 Mbps, less average number of switches at 17, fewer average number of stalls at 15 and their duration of 0.76 second, small average startup delay of 0.71 second, and thus, higher average N-QoE of 0.95. This because of the strong throughput estimation and bandwidth forecasting employed by this embodiment, where, (i) the chunk-based sliding window moving average (SWMA) over every three last downloaded chunks outputs an accurate average throughput values (average of 2.6 Mbps) which are approximated to the average profiles, and (ii) the RLS-based bandwidth forecasting significantly improves the ABR selection process for CMAF low latency by offering the bandwidth forecast for the next average throughput with a very low average RMSE of 0.033 and high average accuracy of 96.63%. Hence, all of these outcomes contribute in achieving a low average live latency of 2.5 seconds ranging from 2.1 to 3.0 seconds, which approximates the average buffer occupancy.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

REFERENCES

The following references are relevant to this disclosure and are incorporated herein in their entirety:

ISO/IEC 23000-19. 2018. Information technology—Multimedia application format (MPEG-A)—Part 19: Common media application format (CMAF) for segmented media.
Abdelhak Bentaleb, Bayan Taani, Ali C Begen, Christian Timmerer, and Roger Zimmermann. 2018. A Survey on Bitrate Adaptation Schemes for Streaming Media over HTTP. IEEE Communications Surveys & Tutorials (2018).
Alexei Botchkarev. 2018. Performance Metrics (Error Measures) in Machine Learning Regression, Forecasting and Prognostics: Properties and Typology. arXiv preprint arXiv:1809.03006 (2018).
Nassima Bouzakaria, Cyril Concolato, and Jean Le Feuvre. 2014. Overhead and performance of low latency live streaming using MPEG-DASH. In Information, Intelligence, Systems and Applications, IISA 2014, The 5th International Conference on. IEEE, 92-97.
Dash Industry Forum. 2017. DASH-264 JavaScript Reference Client. http://dashif. org/reference/players/javascript/index.html. Online; accessed 30 Mar. 2017.
Ali El Essaili, Thorsten Lohmar, and Mohamed Ibrahim. 2018. Realization and Evaluation of an End-to-End Low Latency Live DASH System. In 2018 IEEE International Symposium on Broadband Multimedia Systems and Broadcasting (BMSB). IEEE, 1-5.
Roy Fielding and Julian Reschke. 2014. Hypertext transfer protocol (HTTP/1.1): Semantics and content. Technical Report.
Simon S Haykin. 2008. Adaptive filter theory. Pearson Education India.
Patrice Houzé, Emmanuel Mory, Géraldine Texier, and Gwendal Simon. 2016. Applicative-layer multipath for low-latency adaptive live streaming. In Communications (ICC), 2016 IEEE International Conference on. IEEE, 1-7.
Will Law. 2018. Ultra-Low-Latency Streaming Using Chunked-Encoded and Chunked—Transferred CMAF.
Roger Pantos and William May. 2017. HTTP live streaming. Technical Report.
Yongtao Shuai and Thorsten Herfet. 2018. Towards reduced latency in adaptive live streaming. In Consumer Communications & Networking Conference (CCNC), 201815th IEEE Annual. IEEE, 1-4.
Kevin Spiteri, Rahul Urgaonkar, and Ramesh K Sitaraman. 2016. BOLA: Near-optimal bitrate adaptation for online videos. In INFOCOM 2016—The 35th Annual IEEE International Conference on Computer Communications, IEEE. IEEE, 1-9.
Thomas Stockhammer. 2011. Dynamic adaptive streaming over HTTP-: standards and design principles. In Proceedings of the second annual ACM conference on Multimedia systems. ACM, 133-144.
Viswanathan Swaminathan and Sheng Wei. 2011. Low latency live video streaming using HTTP chunked encoding. In Multimedia Signal Processing (MMSP), 2011 IEEE 13th International Workshop on. IEEE, 1-6.
Truong Cong Thang, Hung T Le, Anh T Pham, and Yong Man Ro. 2014. An evaluation of bitrate adaptation methods for HTTP live streaming. IEEE Journal on Selected Areas in Communications 32, 4 (2014), 693-705.
Cisco VNI. 2018. Cisco Visual Networking Index: Forecast and Trends, 2017-2022.
Xiaoqi Yin, Abhishek Jindal, Vyas Sekar, and Bruno Sinopoli. 2015. A control-theoretic approach for dynamic adaptive video streaming over HTTP. In ACM SIGCOMM Computer Communication Review, Vol. 45. ACM, 325-338.

The invention claimed is:

1. A method for adaptively selecting a bitrate level for streaming a low latency multimedia stream, the multimedia stream comprising a plurality of segments and each segment comprising a plurality of chunks of video, the method comprising:
computing an average throughput based on throughput measurements for a plurality of prior successful chunk downloads;
based on the average throughput, estimating a future bandwidth of a network connection between a media player and a server;
selecting a bitrate level based on the average throughput and the estimated future bandwidth, the bitrate level selected from a plurality of available bitrate levels defined in a manifest file for the low latency multimedia stream; and
selecting a network address from the manifest file, the network address corresponding to a stream encoded at the selected bitrate level,
wherein computing the average throughput comprises recursively computing a gain vector and an inverse correlation matrix of throughput estimation values, and wherein the gain vector and the inverse correlation matrix are recursively computed using a forgetting factor pre-programmed to a given value configured to reduce a weight of throughput estimates.

2. The method of claim 1, further comprising initializing a filter tabs vector with a length, the future bandwidth of the network being based in part on the filter tabs vector.

3. The method of claim 2, further comprising setting an initial inverse correlation matrix according to an initial input variance estimate parameter and the length of the filter tabs vector.

4. The method of claim 1, wherein the bitrate level is further selected based on the playback buffer occupancy.

5. The method of claim 1, further comprising maintaining a buffer occupancy within a range between a minimum threshold and a maximum threshold predetermined for CMAF low latency.

6. A client device, comprising:
a multimedia player comprising a processor and a memory, the multimedia player configured to implement:
a buffer configured to buffer a media content,
an adaptation logic configured to control a bitrate at which the media content is retrieved,
a decoder configured to reproduce the media content; and
a playback interface,
wherein the adaptation logic is configured to implement a throughput estimator, a bandwidth forecasting module, and an ABR controller,
wherein the throughput estimator is configured to compute an average throughput based on throughput measurements for a plurality of prior successful chunk downloads, wherein computing the average throughput comprises recursively computing a gain vector and an inverse correlation matrix of throughput estimation values, and wherein the gain vector and the inverse correlation matrix are recursively computed using a forgetting factor pre-programmed to a given value configured to reduce a weight of throughput estimates,
wherein the bandwidth forecasting module is configured to estimate a future bandwidth of a network connection between the multimedia player and a server based on the average throughput, and
wherein the ABR controller is configured to select a bitrate level based on the average throughput and the estimated future bandwidth and a network address from a manifest file, the bitrate level selected from a plurality of available bitrate levels defined in the manifest file for a low latency multimedia stream, the network address corresponding to a stream encoded at the selected bitrate level.

7. The device of claim 6, wherein the adaptation logic sets the bitrate based on a buffer fill status of the buffer.

8. The device of claim 6, wherein the adaptation logic sets the bitrate based on a measure of a retrieval throughput at which stream data is retrieved.

9. The device of claim 6, wherein the adaptation logic sets the bitrate based on a hybrid approach using a buffer fill status of the buffer and a measure of a retrieval throughput at which stream data is retrieved.

10. The device of claim 6, wherein the adaptation logic further implements an oscillation compensator.

11. The device of claim 6, wherein the adaptation logic further implements a buffer controller and the ABR controller is configured to monitor a playback buffer occupancy using the buffer controller.

12. The device of claim 6, wherein the ABR controller is configured to output a bitrate at which streaming of the media content is controlled.

13. The device of claim 6, further comprising a logger configured to record a status of the multimedia player.

14. The device of claim 6, wherein the ABR controller is configured to implement a throughput-based approach using an estimated throughput.

15. The device of claim 6, wherein the ABR controller is configured to implement a buffer-based approach, using a playback buffer occupancy.

16. The device of claim 6, wherein the ABR controller is configured to implement a hybrid approach using an estimated throughput and a playback buffer occupancy.

17. The device of claim 6, wherein the bandwidth forecasting module comprises an adaptive filter configured to implement a recursive least squares approach.

18. The device of claim 6, wherein the bandwidth forecasting module is configured to implement a deep reinforcement learning approach.

19. The device of claim 6, wherein the bandwidth forecasting module is configured to implement an autoregressive integrated moving average approach.

* * * * *